United States Patent [19]
Kolbeck et al.

[11] Patent Number: 5,489,030
[45] Date of Patent: Feb. 6, 1996

[54] BICYCLE WORK STAND AND METHOD

[76] Inventors: Steven A. Kolbeck, 7770 Crystal Peak, Littleton, Colo. 80127; Patrick R. Meyers, 8148 Sweetwater Rd., Littleton, Colo. 80124

[21] Appl. No.: 346,875

[22] Filed: Nov. 30, 1994

[51] Int. Cl.⁶ ...................................................... B62H 1/00
[52] U.S. Cl. .......................... 211/22; 248/127; 280/293; 280/303
[58] Field of Search ........................ 211/17, 22; 280/293, 280/301, 303; 248/440.1, 127; 482/61

[56] References Cited

U.S. PATENT DOCUMENTS

| | | | |
|---|---|---|---|
| 598,791 | 2/1898 | Leavitt | 211/22 |
| 3,712,637 | 1/1973 | Townsend | 280/293 |
| 3,931,991 | 1/1976 | Marchello | 211/22 X |
| 3,980,320 | 9/1976 | Marchello | 211/22 X |
| 4,591,180 | 5/1986 | Copple | 280/293 |
| 4,834,405 | 5/1989 | Dimaio | 211/22 X |
| 4,971,346 | 11/1990 | Faler et al. | 280/293 |
| 4,979,759 | 12/1990 | Solovay | 211/22 X |
| 5,346,238 | 9/1994 | Greenfield | 280/293 |

FOREIGN PATENT DOCUMENTS

| | | | |
|---|---|---|---|
| 5577 | 2/1894 | Switzerland | 280/293 |
| 26861 | 12/1898 | United Kingdom | 211/22 |

OTHER PUBLICATIONS

Inside Communications, Inc., *VeloNews*, Sep. 12, 1994, vol. 23, No. 15, p. 50.

*Primary Examiner*—Robert W. Gibson, Jr.
*Attorney, Agent, or Firm*—Michael A. Capraro

[57] ABSTRACT

A new and novel bicycle work stand utilized to effect repairs and adjustments to a bicycle. The bicycle work stand is constructed having a base member with spaced apart legs and an end portion. At least two spaced apart hooking means having cradle areas, extension arms and non-abrasive material covering the cradle areas of the at least two spaced apart hooking means are fixedly attached to the end portion of the base member. A support plate having support ears, V-shaped notches and non-abrasive material covering the support ears is fixedly attached to ends of the extension arms of the at least two spaced apart hooking means. A bottom bracket of a bicycle is removably engaged by the at least two spaced apart hooking means so that the cradle areas of the spaced apart hooking means removably contact an underneath portion of the bottom bracket of the bicycle. The support ears of the support plate contact an inner underside of chain stays of the bicycle producing an uplifting effect on the chain stays and on a rear wheel of the bicycle. The non-abrasive material covering the cradle areas of the spaced apart hooking means and the support ears prevents gouging, marring, scratching and defacing of the finished surface of the bicycle. The V-shaped notches prevent damage to various cables routed along the bicycle and facilitate the repair and adjustment or removal or installation of such cables. The bicycle work stand properly positions a bicycle for repairs and adjustments while maintaining stability and balance of the bicycle by utilizing a three point footprint and an oblique contact angle with the ground or similar flat surface. Also disclosed is a new and novel method for using the bicycle work stand.

17 Claims, 7 Drawing Sheets

BICYCLE WORK STAND AND METHOD

BACKGROUND OF THE INVENTION

This invention relates generally to work stands and more specifically to a new and novel bicycle work stand and method. The new and novel bicycle work stand and method is designed to place a bicycle in a proper position to effect repairs and adjustments to a bicycle while providing stable and balanced support of the bicycle.

While there are a wide variety of bicycle stands that provide some support for a bicycle, such as The Greenfield Easystand®, manufactured by Greenfield®, these stands are designed to be portable kick-stands providing support to a bicycle while both front and rear wheels of the bicycle remain on the ground. Thus, since the rear wheel of a bicycle is not elevated by this type of stand, repairs and adjustments to the bicycle cannot be easily and readily effected thereby limiting the use if this type of stand. Other storage type stands are also available and are equally unsuited for effecting repairs and adjustments on a bicycle. These types of storage stands are generally constructed of lightweight material that cannot adequately support the bulk of the weight of a bicycle and further, are not designed to support the bulk of the weight of a bicycle. Like the before mentioned portable kick-stand, these types of storage stands are designed to support a bicycle while both front and rear wheels remain on the ground, thereby utilizing the contact points between both the front and rear wheels and the ground as additional support.

Another type of stand that functions solely as a bicycle work stand is of the type having a base and elevated curved arm. The end of the elevated curved arm is designed to grip a bicycle at some point on the bicycle frame thereby elevating the bicycle from the ground. These types of work stands are cumbersome and require extra work space to effect repairs and adjustments on a bicycle. Additionally, these types of work stands must either be left assembled, taking up valuable space, or the stand must be disassembled after each use and reassembled prior to the next use.

Another problem encountered with stands of this type is that these stands limit the accessibility of various areas of a bicycle that may be in need of repair or adjustment. Since this type of stand has an elevated arm which holds the bicycle in place, the elevated arm may at times be in the way of a technician or other person attempting to repair or adjust various components of a bicycle. The bicycle must then be re-positioned in the stand to continue the repairs or adjustments.

SUMMARY OF THE INVENTION

To overcome the before described considerations and problems inherent in and encountered with prior art bicycle stands, there is provided by the subject invention a unique bicycle work stand and method that effectively positions a bicycle so that all components of the bicycle needing repair and adjustment are easily and readily accessible while providing stable and balanced support of the bicycle. The new and novel bicycle work stand is also designed to be easily stored without disassembly and thus, without the need to re-assemble the bicycle work stand before use on an bicycle. Additionally, the new and novel bicycle work stand does not encroach on the space available for effecting repairs and adjustments to a bicycle.

Applicant's new and novel bicycle work stand is constructed with a base member having spaced apart legs and an end portion. The end portion of the base member has fixedly attached thereto at least two spaced apart hooking means having a cradle area, extension arms and a non-abrasive material covering the cradle area. The at least two spaced apart hooking means arc angularly offset in relation to the base member. A support plate having support ears, notches in close proximity to the support ears and a non-abrasive material covering the support ears is fixedly attached to the extension arms of the at least two spaced apart hooking means. The support ears and notches are continuously formed on the support plate.

In the Preferred Embodiment, the new and novel bicycle work stand is further constructed front a rigid, non-flexing material such as steel, aluminum, brass and other metal alloys. Also in the Preferred Embodiment, the at least two spaced apart hooking means are fixedly attached to a side and an opposite side of the end portion of the base member by welding, brazing, high temperature fusion, or other metal joining methods. Similarly, a side of the support plate is fixedly attached to ends of the extension arms of the at least two spaced apart hooking means by welding, brazing, high temperature fusion, or other metal joining methods.

The at least two spaced apart hooking means are designed to removably engage a bottom bracket of a bicycle. Cradle areas formed in the spaced apart hooking means support the bulk of the weight of the bicycle when the new and novel bicycle work stand is positioned on the bottom bracket of a bicycle. The cradle areas form a pivoting point around which the offset base member, and thus, around which the support ears also pivot. The support ears can then be moved into a position where the support ears contact an inner underside of the chain stays of a bicycle in an uplifting motion. The uplifting motion of the support ears elevates a rear portion of the bicycle and thus a rear wheel of the bicycle is also elevated. The spaced apart legs of the base member then rest on the ground, work bench or similar flat surface.

The non-abrasive material covering the cradle area and support ears protects the finished surface of the bicycle. In the Preferred Embodiment, the non-abrasive material is rubber, soft plastic, vinyl and the like. The non-abrasive material is provided in pre-molded sections, the pre-molded sections of non-abrasive material being designed to removably cover the cradle areas and support ears. Thus, in the event the non-abrasive material covering a portion of the spaced apart hooking means and a portion of the support plate should become worn, the non-abrasive material can be easily and readily replaced by removing the worn pre-molded section of non-abrasive material and replacing the worn section with a new pre-molded section of non-abrasive material. In another embodiment, the non-abrasive material is commercially provided in a liquid form that is applied by dipping, brushing or spraying.

Once the new and novel bicycle work stand has been properly positioned on a bicycle, repairs and adjustments to the bicycle can be easily and readily effected. Since the new and novel bicycle work stand supports the bicycle from underneath, all components of the bicycle are easily and readily accessible. Additionally, since the bicycle work stand supports the bicycle from underneath, there is no need to realign the bicycle in the work stand to access components of the bicycle requiring repairs and adjustment. Also, since the new and novel bicycle work stand elevates the rear portion of the bicycle, and thus elevates the rear ,wheel of the bicycle, the drive system and rear braking system of a bicycle are easily and readily accessible. Elevating the rear wheel allows the rear wheel to freely rotate thereby facilitating repairs and adjustments to the drive system and rear braking system of a bicycle as well as facilitating repairs and adjustments to the rear wheel itself.

Since the base member has continuously formed thereon spaced apart legs, the bicycle work stand provides a very stable and balanced three point footprint, two of the three points being the spaced apart legs of the base member and the third point being the front wheel of the bicycle which remains on the ground once the rear wheel has been elevated. The angular offset of the at least two spaced apart hooking means in relation to the base member causes the base member to contact the ground, work bench or similar flat surface at an oblique angle whose direction is away from the front wheel thereby providing additional stability and balance to the bicycle work stand when positioned on a bicycle.

Various cables are typically routed along the framework of a bicycle. Some cables, such as de-railer cables, are routed underneath the bottom bracket of a bicycle and along the chain stays of a bicycle. Notches provided in close proximity to the support ears of the support plate prevent the bicycle work stand from interfering with these cables when the bicycle work stand is positioned on the bicycle. The generally V-shaped notches also facilitate the removal and installation of such cables. New de-railer cables are generally stiff and difficult to maneuver while old de-railer cables generally contain various fixed bends and angles, caused by the routing of the cables, that are retained by the cables. Thus, in the case where new cables are being installed on a bicycle, applicant's new and novel bicycle work stand facilitates installation by allowing the cables to be easily and readily passed through the notches and properly routed along the bicycle. Similarly, in the case where old cables are being removed, adjusted or re-routed, applicant's new and novel bicycle work stand facilitates removal of the cables by allowing the various fixed bends and angles retained by the old cables to be easily and readily passed through notches. Thus, repairs and adjustments to or installation or removal of these cables can be effected without having to realign the bicycle in the new and novel bicycle work stand.

To achieve the foregoing and other advantages, the present invention provides a new and novel bicycle work stand designed to easily and readily support a prior art bicycle, without gouging, marring, scratching or defacing the finished surface of the bicycle, while providing stable and balanced support to the bicycle when the bicycle work stand has been used to place the bicycle in a proper position to effect repairs and adjustments to the bicycle.

The more important features of the present invention have been broadly outlined in order that the detailed description thereof that follows may be better understood and in order that the present contribution to the art may be better appreciated. There are additional features of the invention that will be more fully described hereinafter and which, together with the features outlined above, will form the subject matter of the claims appended hereto. Those skilled in the art will appreciate that the conception, upon which the present disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly front a cursory review the nature and essence of the technical disclosure of the application. The abstract is neither intended to define the invention of the application, which is measured by the claims, nor is it intended to be limiting as to the scope of the invention in any way.

Accordingly, it is an object and advantage of the invention to provide a new and novel bicycle work stand that easily and readily positions a bicycle so that repairs and adjustments to the bicycle may be easily and readily effected.

Another object and advantage of the invention is to provide a new and novel bicycle work stand that provides stable and balanced support of a bicycle when the bicycle is positioned to effect repairs and adjustments to the bicycle.

Another object and advantage of the invention is to provide a new and novel bicycle work stand that facilitates the removal and installation of various cables that may be routed along the framework of a bicycle.

Another object and advantage of the invention is to provide a new and novel bicycle work stand that does not gouge, mar, scratch or deface a bicycle when the bicycle work stand bicycle is used to position a bicycle for repairs.

Still another object and advantage of the invention is to provide a new and novel bicycle work stand that does not require assembly or disassembly.

Another object and advantage of the invention is to provide a new and novel bicycle work stand that does not encroach on available work space.

Another object and advantage of the invention is to provide a new and novel bicycle work stand that allows access to all components of a bicycle being repaired or adjusted without realignment of the bicycle in the bicycle work stand.

Another object and advantage of the invention is to provide a new and novel bicycle work stand which may be easily and efficiently manufactured and marketed.

Yet another object and advantage of the invention is to provide a new and novel bicycle work stand which is of durable and reliable construction.

These and other objects and advantages will become apparent from review of the drawings and from a study of the Description of the Preferred Embodiment relating to the drawings which has been provided by way of illustration only.

DESCRIPTION OF THE PREFERRED EMBODIMENT

Figure 1:
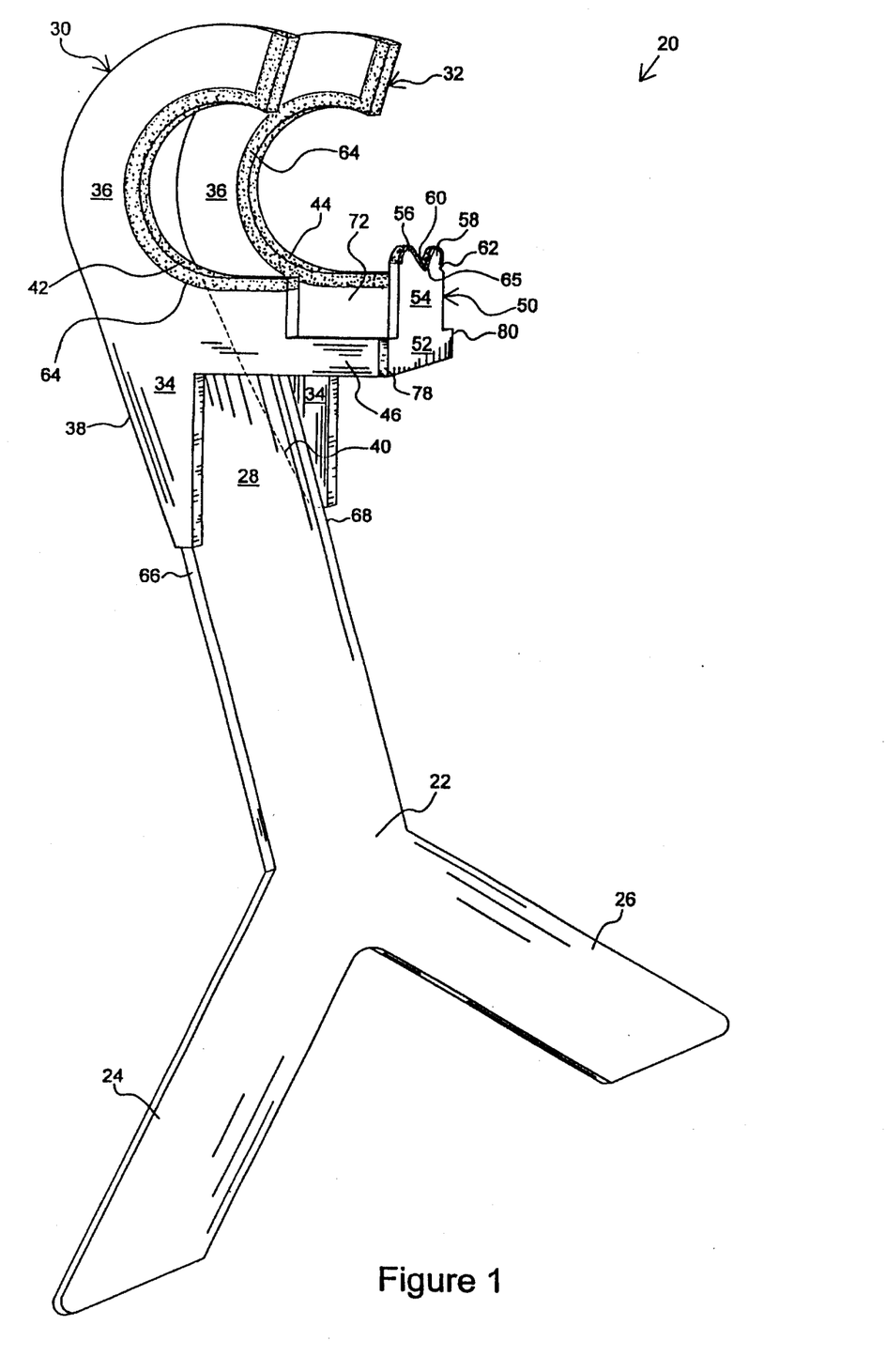
FIG. 1 is a perspective view of applicant's new and novel bicycle work stand.

Referring to the drawings in general and in particular to FIG. 1 of the drawings, there is shown applicant's new and novel bicycle work stand shown generally by the numeral 20. Applicant's new and novel bicycle work stand 20 has been designed to be utilized with prior art bicycles of various types to position a prior art bicycle so that repairs and adjustments to various parts of a prior art bicycle may be readily and easily completed.

Referring now to FIG. 1 of the drawings there is shown a perspective view of the new and novel bicycle work stand 20. In the Preferred Embodiment, the bicycle work stand 20 is constructed from a rigid, non-flexing material such as steel, aluminum, brass and other metal alloys known in the art. In the Preferred Embodiment, the rigid, non-flexing material is designed to be front one eighth of an inch thick to three eighths of an inch thick. Other rigid, non-flexing materials and other thicknesses may also be used and are considered to be within the spirit and scope of the applicant's invention.

A continuously formed inverted Y-shaped base member, shown generally by the numeral 22, having spaced apart legs 24 and 26, and an end portion, shown generally by the numeral 28, has fixedly attached thereto at least two spaced apart hooking means, shown generally by the numerals 30 and 32. A portion of end portion 28 is not visible in FIG. 1 of the drawings. In the Preferred Embodiment, the end portion 28 has at least two spaced apart hooking means fixedly attached thereof. Other combinations of spaced apart hooking means may also be used and are considered to be within the spirit and scope of the applicant's invention.

The at least two spaced apart hooking means 30 and 32 have a lower portion, shown generally by the numeral 34, and an upper portion, shown generally by the numeral 36. Spaced apart hooking means 30 and 32 have an outer edge, 38 and 40 respectively, in lower portion 34 of the at least two spaced apart hooking means 30 and 32. Outer edge 40 of spaced apart hooking means 32 is shown in dashed lines for purposes of clarity. The method of attachment of the at least two spaced apart hooking means 30 and 32 to end portion 28 of inverted Y-shaped base member 22 will be discussed more fully hereinafter.

Spaced apart hooking means 30 and 32 have continuously formed therein cradle areas 42 and 44 respectively, cradle areas 42 and 44 being continuously formed in upper portion 36 of spaced apart hooking means 30 and 32 respectively. In the Preferred Embodiment, cradle areas 42 and 44 have a pre-determined shape, the pre-determined shape being generally semi-circular having a radius in a range of 15 millimeters to 30 millimeters. Other configurations and radii may also be used and are considered to be within the spirit and scope of the applicant's invention.

Spaced apart hooking means 30 and 32 have formed continuously thereon extension arms 46 and 48 respectively. Extension arm 48 is not visible in FIG. 1 of the drawings but is clearly shown in FIG. 3 of the drawings. Still referring to FIG. 1 of the drawings, a support plate, shown generally by the numeral 50, is fixedly attached to extension arms 46 and 48 of spaced apart hooking means 30 and 32 respectively.

Support plate 50 has a lower portion, shown generally by the numeral 52, and an upper portion, shown generally by the numeral 54. Support ears 56 and 58 and notches 60 and 62 are continuously formed in upper portion 54 of support plate 50. Support ears 56 and 58, notches 60 and 62 and the method of attachment of support plate 50 to extension arms 46 and 48 will be discussed more fully hereinafter.

Cradle areas 42 and 44 of spaced apart hooking means 30 and 32 and support ears 56 and 58 of support plate 50 are covered with a non-abrasive material shown generally by the numerals 64 and 65. In the Preferred Embodiment, the non-abrasive material 64 is rubber, soft plastic, vinyl and the like. Also in the Preferred Embodiment, the non-abrasive material 64 and 65 is provided in pre-molded sections, the pre-molded sections of non-abrasive material 64 being designed to removably cover cradle areas 42 and 44 and the pre-molded sections of non-abrasive material 65 being designed to removably cover support ears 56 and 58. The non-abrasive material 64 and 65 is fixedly attached to cradles areas 42 and 44 and support ears 56 and 58 by adhesives known in the art. Thus, in the event the non-abrasive material 64 and 65 should become worn, the non-abrasive material 64 and 65 can be easily and readily replaced by removing the worn pre-molded section of non-abrasive material 64 and 65 and replacing the worn section with a new pre-molded section of non-abrasive material 64 and 65. Other non-abrasive materials known in the art and other methods of application known in the art may also be used and are considered to be within the spirit and scope of the applicant's invention.

In another embodiment, the non-abrasive material 64 and 65 is commercially provided in a liquid form that is applied by dipping, brushing or spraying. Thus, cradle areas 42 and 44 and support ears 56 and 58 may be coated with a liquid form of non-abrasive material 64 and 65 such as liquid rubber, liquid plastics, liquid vinyl and the like, that when properly cured and dried provide a non-abrasive covering 64 and 65 that will not mar the finish of a bicycle.

Figure 2:
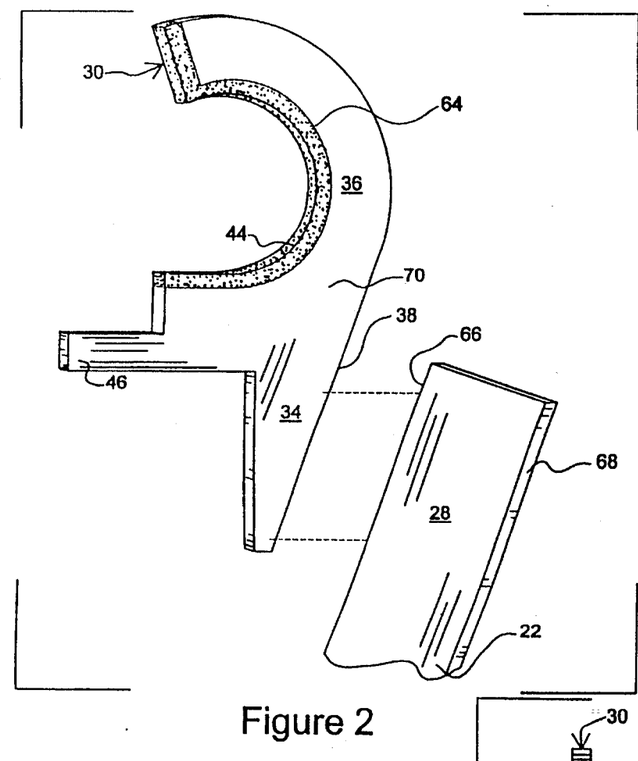
FIG. 2 is an exploded view of a portion of applicant's new and novel bicycle work stand.

Referring now to FIG. 2 of the drawings there will be shown and described in detail the attachment of spaced apart hooking means 30 to end portion 28 of base member 22. FIG. 2 of the drawings is an exploded view of spaced apart hooking means 30 and end portion 28 of base member 22 of applicant's new and novel bicycle work stand 20. Spaced apart hooking means 32, support plate 50 and a lower portion of base member 22 have not been shown for purposes of clarity.

End portion 28 of base member 22 has a side 66 and an opposite side 68. Spaced apart hooking means 30 and 32 have an inner surface 70 and 72 respectively. Inner surface 72 and spaced apart hooking means 32 are not shown in FIG. 2 of the drawings for purposes of clarity but are clearly shown in FIG. 1 of the drawings. Still referring to FIG. 2 of the drawings, inner surface 70 of spaced apart hooking means 30 is fixedly attached to side 66 of end portion 28 of base member 22. Spaced apart hooking means 30 is fixedly positioned on side 66 of end portion 28 of base member 22 so that a longitudinal axis of outer edge 38, located in lower portion 34 of spaced apart hooking means 30 is angularly offset from a longitudinal axis of base member 22.

Referring briefly back to FIG. 1 of the drawings, in the Preferred Embodiment, spaced apart hooking means 32, is similarly fixedly attached to opposite side 68 of end portion 28 of base member 22. Inner surface 72 of spaced apart hooking means 32 is fixedly attached to opposite side 68 of end portion 28 of base member 22. Spaced apart hooking means 32 is similarly fixedly positioned on opposite side 68 so that a longitudinal axis of outer edge 40, located in lower portion 34 of spaced apart hooking means 32 is similarly angularly offset from a longitudinal axis of base member 22. Thus, the attachment of spaced apart hooking means 30 and 32 to end portion 28 of base member 22, as before described, results in a spaced apart configuration of spaced apart hooking means 30 and 32 as illustrated in FIG. 1 of the drawings. The angular offset of spaced apart hooking means 30 and 32 in relation to base member 22 will be discussed more fully hereinafter.

In the Preferred Embodiment, spaced apart hooking means 30 and 32 are fixedly attached to end portion 28 of base member 22 by welding, brazing, high temperature fusion, or other metal joining methods known in the art. Other known joining methods may also be used and are considered to be within the spirit and scope of the applicant's invention. In another embodiment, spaced apart hooking means 30 and 32 are continuously formed on end portion 28 of base member 22 by casting or other molding techniques known in the art. Other known methods of continuous formation may also be used and are considered to be within the spirit and scope of the applicant's invention.

Figure 3:
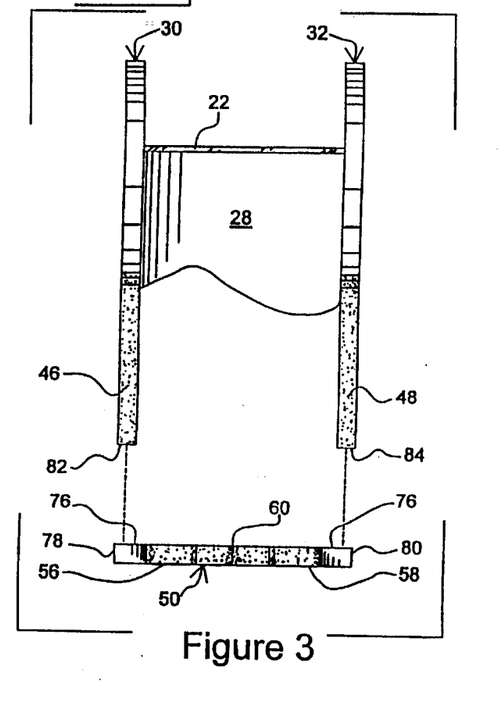
FIG. 3 is an exploded top view of a portion of applicant's new and novel bicycle work stand.

Referring now to FIG. 3 of the drawings there will be shown and described in detail the attachment of the support plate, shown generally by the numeral 50, to extension arms 46 and 48 of spaced apart hooking means 30 and 32. FIG. 3 of the drawings is an exploded top view of a portion of applicant's new and novel bicycle work stand 20. Support plate 50 has been shown exploded from the bicycle work stand 20 and a portion of base member 22 has not been shown in FIG. 3 of the drawings for purposes of clarity.

Support plate 50 has a side 76, an attaching tab 78 and a laterally opposed attaching tab 80 continuously formed in lower portion 52 as is clearly illustrated in FIG. 1 of the drawings. Still referring to FIG. 3 of the drawings, extension arms 46 and 48 have ends 82 and 84 respectively. Side 76 of support plate 50 is fixedly attached to ends 82 and 84 so that attaching tab 78 is fixedly attached to end 82 of extension arm 46 and laterally opposed attaching tab 80 is fixedly attached to end 84 of extension arm 48. Support plate 50 is thus properly oriented on extension arms 46 and 48 of spaced apart hooking means 30 and 32, respectively, so that lower portion 52 of support plate 50 aligns with lower portion 34 of spaced apart hooking means 30 and 32 and upper portion 54 of support plate 50 aligns with upper portion 36 of spaced apart hooking means 30 and 32. See generally FIG. 1 of the drawings.

Still referring to FIG. 3 of the drawings and in the Preferred Embodiment, attaching tabs 78 and 80 of support plate 50 are fixedly attached to ends 82 and 84 of spaced apart hooking means 30 and 32 by welding, brazing, high temperature fusion, or other metal joining methods known in the art. Other known joining methods may also be used and are considered to be within the spirit and scope of the applicant's invention. In another embodiment, support plate 50 is continuously formed on ends 82 and 84 of spaced apart hooking means 30 and 32 by casting or other molding techniques known in the art. Other known methods of continuous formation may also be used and are considered to be within the spirit and scope of the applicant's invention.

Figure 4:
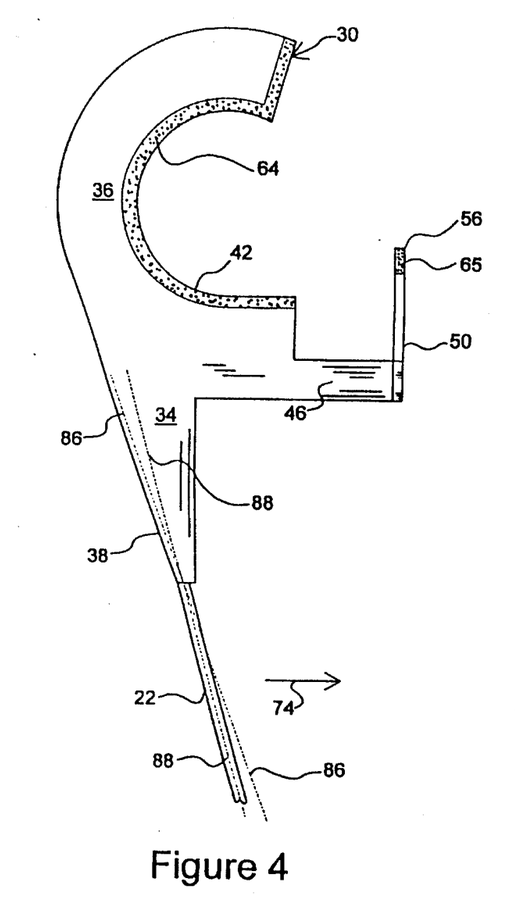
FIG. 4 is a right side elevational view of a portion of applicant's new and novel bicycle work stand.

Referring now to FIG. 4 of the drawings there is shown a right side elevational view of a portion of applicant's new and novel bicycle work stand 20. FIG. 4 of the drawings illustrates the angular offset of outer edge 38 of spaced apart hooking means 30 in relation to base member 22. The angular offset of spaced apart hooking means 32 in relation to base member 22 is not shown in FIG. 4 of the drawings for purposes of clarity. However, the angular offset of spaced apart hooking means 32 in relation to base member 22 is a mirror image of FIG. 4 of the drawings.

A longitudinal axis of spaced apart hooking means 30, shown generally by the numeral 86, follows outer edge 38 of the lower portion 34 of spaced apart hooking means 30. Spaced apart hooking means 30 is fixedly attached to base member 22, as previously described, so that the longitudinal axis 86 of spaced apart hooking means 30 is angularly offset from a longitudinal axis of base member 22, shown generally by the numeral 88, in the direction of arrow 74. In the Preferred Embodiment, the angular offset of the respective before mentioned longitudinal axes may be from zero degrees to thirty degrees. Other angular degrees of offset may also be used and are considered to be within the spirit and scope of the applicant's invention.

The angular offset of spaced apart hooking means 32 in relation to base member 22 is a mirror image of the angular offset of spaced apart hooking means 30 in relation to base member 22 as shown in FIG. 4 of the drawings but has not been shown for purposes of clarity.

Figure 5:
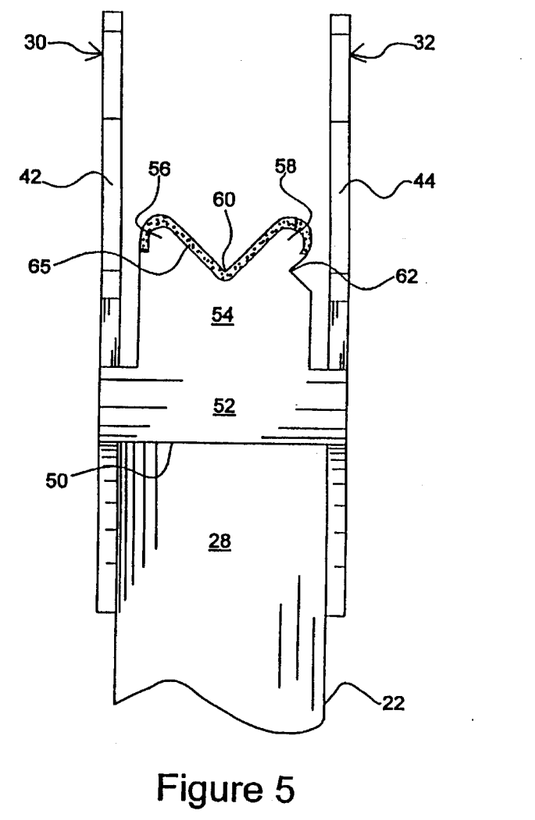
FIG. 5 is a front elevational view of a portion of applicant's new and novel bicycle work stand.

Referring now to FIG. 5 of the drawings there is shown a front elevational view of a portion of applicant's new and novel bicycle work stand 20. FIG. 5 of the drawings illustrates the configuration and orientation of support plate 50. Support ears 56 and 58 have been designed to removably contact chain stays of a prior art bicycle. Notches 60 and 62 are continuously formed in support plate 50 in close proximity to support ears 56 and 58, respectively, and have been designed to allow the bicycle work stand 20 to be placed in proximity to a front de-railer cable and a rear de-railer cable, respectively, of a prior art bicycle without interfering with the cables. A prior art bicycle having chain stays, a front de-railer cable and a rear de-railer cable has not been shown in FIG. 5 of the drawings for purposes of clarity but will be discussed more fully hereinafter.

Referring now to FIGS. 6 to 11 of the drawings in general, there will be described in detail how applicant's new and novel bicycle work stand 20 is used with a prior art bicycle to position a prior art bicycle so that repairs and adjustments to various parts of a prior art bicycle may be readily and easily completed.

Figure 6:
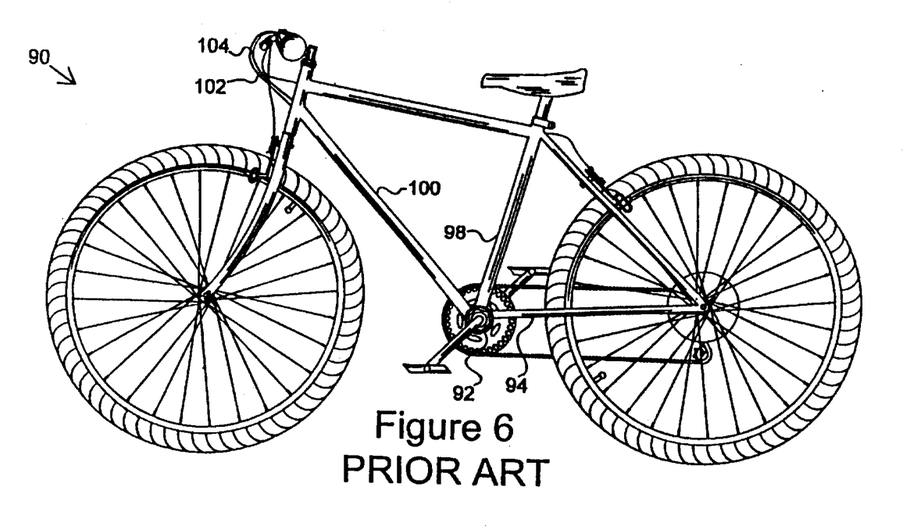
FIG. 6 is a side elevational view of a prior art bicycle.

Referring to FIG. 6 of the drawings there is shown a prior art bicycle shown generally by the numeral 90. FIG. 6 is a side elevational view of a prior art bicycle 90. The prior art bicycle 90 is shown in the Preferred Embodiment and in FIG. 6 of the drawings for purposes of illustration only. Applicant's new and novel bicycle work stand 20 may also be used with bicycles having other shapes, designs, configurations and sizes.

Prior art bicycles, of the type illustrated in FIG. 6 and shown generally by the numeral 90, have a bottom bracket 92 and chain stays 94 and 96. Chain stay 96 cannot be seen FIG. 6 of the drawings but is clearly illustrated in FIG. 7 of the drawings. Still referring to FIG. 6 of the drawings there is also shown seat tube 98 and down tube 100.

A front de-railer cable 102 is routed from a shifting mechanism, not shown in FIG. 6 of the drawings for purposes of clarity, along the underside of down tube 100, below bottom bracket 92, along a lower portion of seat tube 98 and ending at a front de-railer mechanism which is also not shown in FIG. 6 of the drawings for purposes of clarity. Similarly, a rear de-railer cable 104 is routed from a shifting mechanism, not shown in FIG. 6 of the drawings for purposes of clarity, along a side of down tube 100, below bottom bracket 92, along chain stay 96 and ending at a rear de-railer mechanism. Chain stay 96 and the rear de-railer mechanism are also not shown in FIG. 6 of the drawings for purposes of clarity. The orientation of the front de-railer cable 102 and rear de-railer cable 104 in relation to portions of a prior art bicycle 90 and applicant's new and novel bicycle work stand 20, will be discussed more fully hereinafter.

Figure 7:
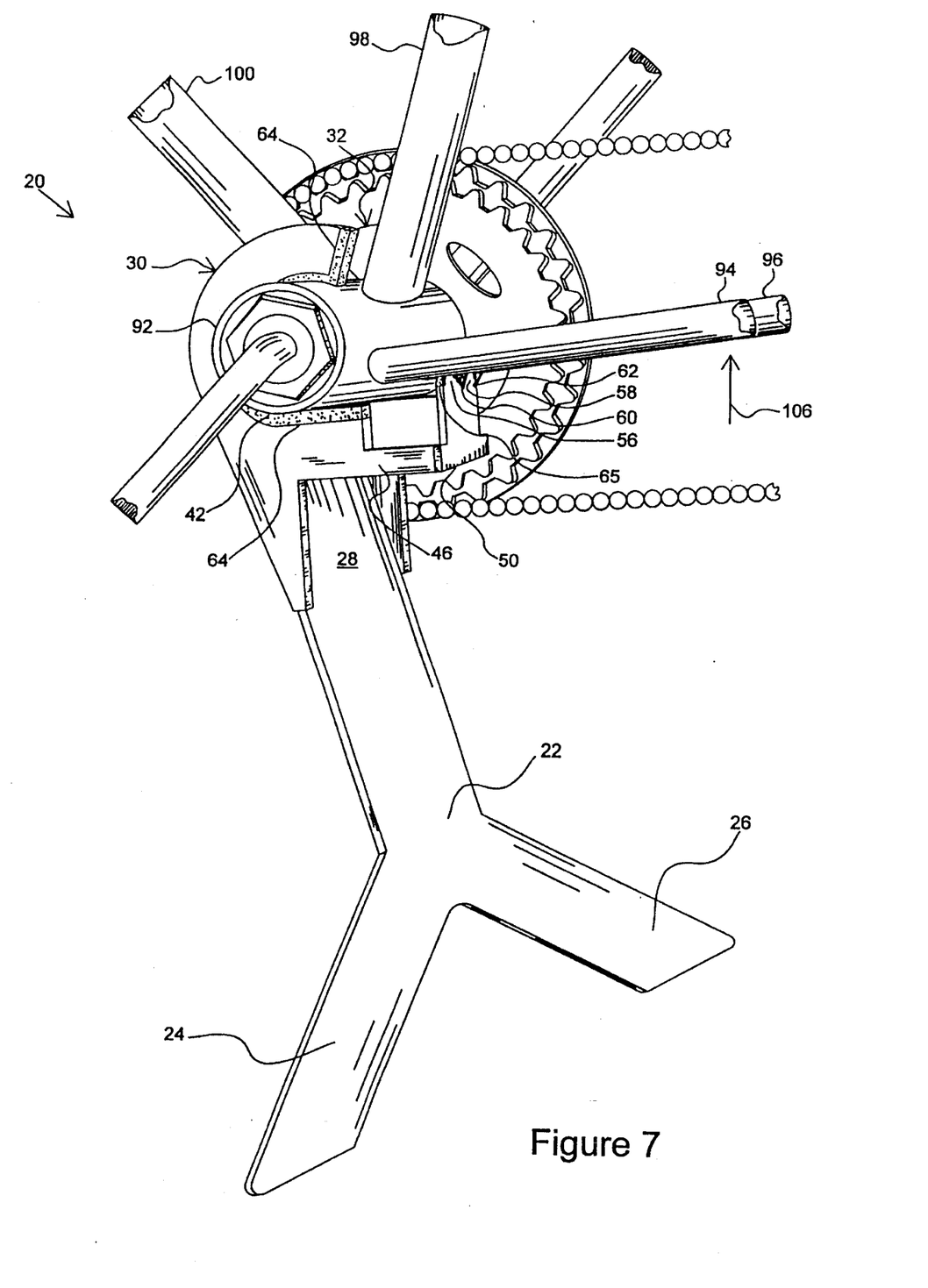
FIG. 7 is an enlarged perspective view of applicant's new and novel bicycle work stand in position on the appropriate portion of a prior art bicycle.

Referring now to FIG. 7 of the drawings there is shown applicant's new and novel bicycle work stand 20 positioned on a portion of a prior art bicycle 90. FIG. 7 of the drawings is an enlarged perspective view of the bicycle work stand 20 in position on the appropriate portion of a prior art bicycle 90. Only a portion of the prior art bicycle 90 has been shown in FIG. 7 of the drawings for purposes of clarity.

Spaced apart hooking means 30 and 32 removably engage bottom bracket 92 of a bicycle. The spaced apart configuration of spaced apart hooking means 30 and 32 allow spaced apart hooking means 30 to be positioned on a one side of down tube 100 and seat tube 98 while spaced apart hooking means 32 is simultaneously positioned on an opposite side of down tube 100 and seat tube 98.

Support ears 56 and 58 removably contact chain stays 94 and 96 at a position on an inner underside portion of chain stays 94 and 96. Thus, once the spaced apart hooking means 30 and 32 have removably engaged bottom bracket 92 and support ears 56 and 58 have removably contacted chain stays 94 and 96, cradle areas 42 and 44 support a bicycle at bottom bracket 92 while support ears 56 and 58 support chain stays 94 and 96. Since the bottom bracket 92 of bicycle may vary in diameter, cradle areas 42 and 44 have been designed with a pre-determined shape, the pre-determined shaped proximately engaging the bottom bracket 92. Additionally, the pre-determined shape of cradle areas 42 and 44 is generally semi-circular in shape as previously described. Cradle area 44 is not visible in FIG. 7 of the drawings but is clearly shown in FIGS. 1 and 5 of the drawings.

Still referring to FIG. 7 of the drawings, the angular offset of spaced apart hooking means 30 and 32 from base member 22 produces an uplifting effect on support plate 50 when the bicycle work stand 20 is positioned on the bottom bracket 92 of a bicycle 90 thereby causing support ears 56 and 58 to raise chain stays 94 and 96 in the direction of arrow 106. The resulting uplifting effect, which facilitates repairs and adjustments to the bicycle, and the position of support ears 56 and 58 on chain stays 94 and 96 will be discussed more fully hereinafter.

Since support ears 56 and 58 and cradle areas 42 and 44 are covered with non-abrasive material 65 and 64, respectively, such as rubber, plastic, vinyl and the like, as previously described, the finished surface of a prior art bicycle is not gouged, marred, scratched or defaced by applicant's new and novel bicycle work stand 20 when the bicycle work stand 20 is positioned on a bicycle to effect repairs and adjustments to the bicycle.

Figure 8:
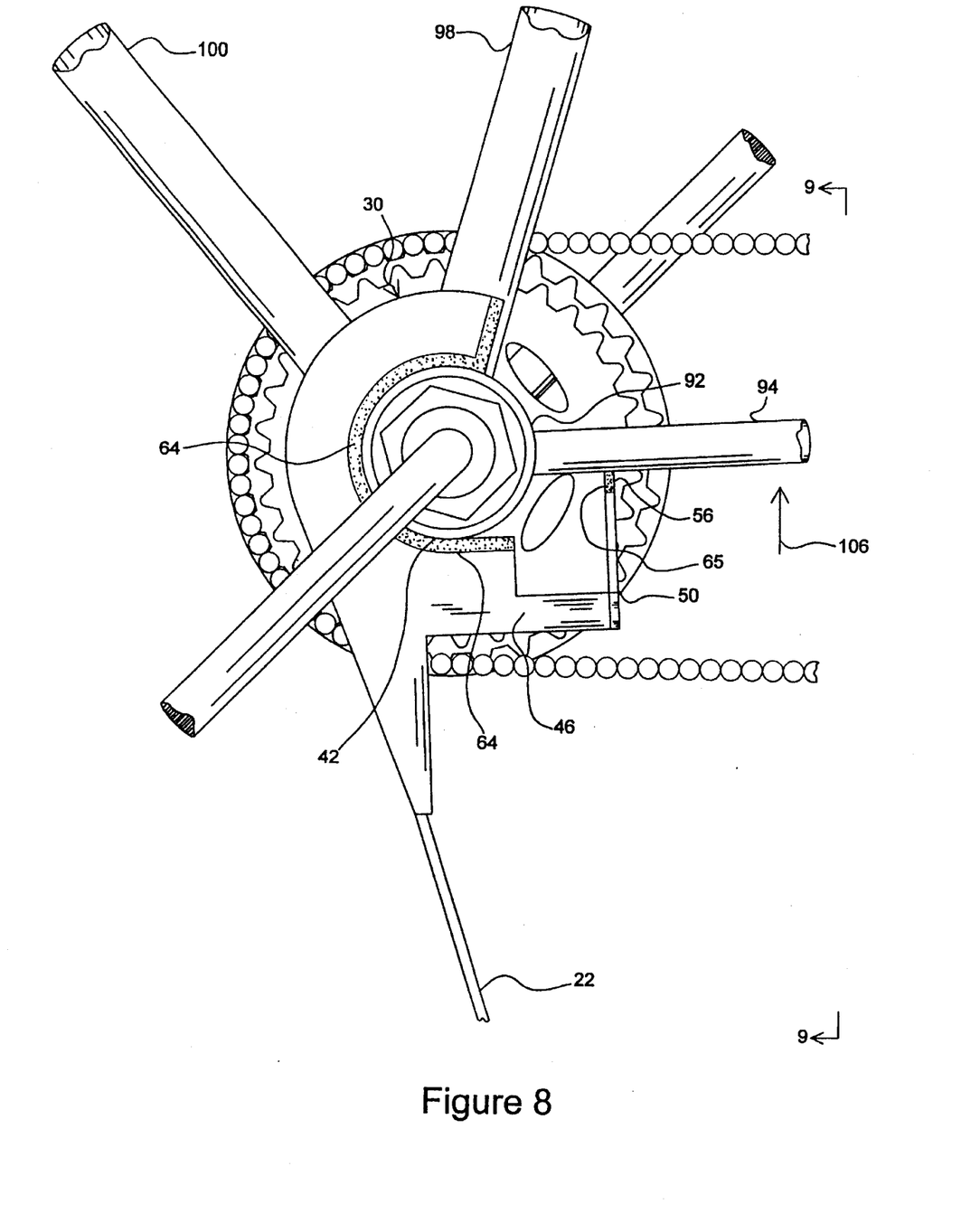
FIG. 8 is a right side elevational view of a portion of applicant's new and novel bicycle work stand in position on the appropriate portion of a prior art bicycle.

Referring now to FIG. 8 of the drawings there is shown a right side elevational view of a portion of applicant's new and novel bicycle work stand 20 in position on the appropriate portion of a prior art bicycle 90. A lower portion of base member 22 and a portion of a prior art bicycle 90 are not shown for purposes of clarity. FIG. 8 of the drawings illustrates the relationship of cradle area 42 to bottom bracket 92 and the relationship of support ear 56 to chain stay 94, respectively, of a prior art bicycle. The relationship of cradle area 44 to bottom bracket 92 and the relationship of support ear 58 to chain stay 96, respectively, is a mirror image of FIG. 8 of the drawings, but has not been shown for purposes of clarity.

Once the bicycle work stand 20 has been positioned on a bicycle, spaced apart hooking means 30 removably engages bottom bracket 92 so that cradle area 42 provides support of the bicycle at bottom bracket 92. Although cradle area 44 of spaced apart hooking means 32 is not visible in FIG. 8 of the drawings, cradle area 44, being a mirror image of cradle area 42, simultaneously engages bottom bracket 92 as before described and also provides support of the bicycle at bottom bracket 92. Thus, the bulk of the weight of a bicycle can be easily and readily supported by cradle areas 42 and 44 of applicant's new and novel bicycle work stand 20.

Additionally, once the bicycle work stand 20 has been positioned on a bicycle, support ear 56 removably contacts chain stay 94 at a position on an inner underside portion of chain stay 94. Although support ear 58 and chain stay 96 are not visible in FIG. 8 of the drawings, support ear 58 simultaneously contacts chain stay 96 at a position on an inner underside portion of chain stay 96. The relation of support ear 58 to chain stay 96 is a mirror image of support ear 56 and chain stay 94 as shown in FIG. 8 of the drawings, but has not been shown for purposes of clarity.

The apex of support ears 56 and 58 is designed to be higher than the lowest point of cradle areas 42 and 44. In the Preferred Embodiment, the apex of support ears 56 and 58 is designed to be from 12 millimeters to 20 millimeters higher than the lowest point of cradle areas 42 and 44. Other heights may also be used and are considered to be within the spirit and scope of the applicant's invention.

The before described relation of support ears 56 and 58 to cradle areas 42 and 44 allows support ears 56 and 58 to pivot around cradle areas 42 and 44. Thus, once the bicycle work stand 20 has been positioned on a bicycle, it can easily be seen how support ears 56 and 58 effectively move chain stays 94 and 96 front a normal position to an uplifted position, in the direction of arrow 106 by the before described pivoting action around cradle areas 42 and 44 and thus around bottom bracket 92. The uplifting movement of chain stays 94 and 96 results in the raising of a rear wheel of a prior art bicycle 90, not shown in FIG. 8 of the drawings for purposes of clarity but which will be discussed more fully hereinafter.

Figure 9:
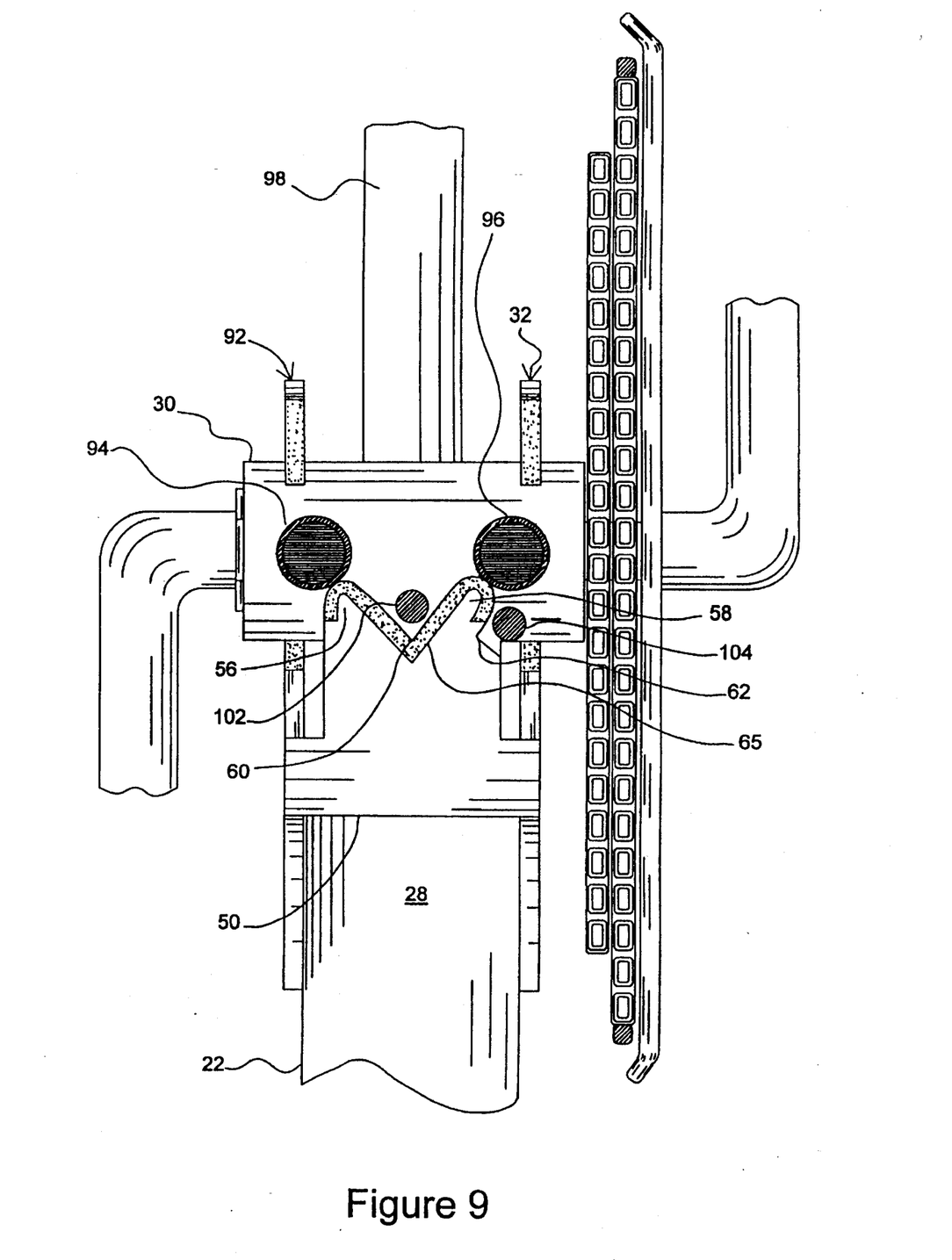
FIG. 9 is a sectional view of applicant's new and novel bicycle work stand in position on a bicycle taken along lines 9—9 of FIG. 8 of the drawings.

Referring now to FIG. 9 of the drawings there will be shown and described in detail the positioning of support ears 56 and 58 on chain stays 94 and 96. Additionally, there will be shown and described in detail notches 60 and 62 of support plate 50. FIG. 9 is a sectional view of applicant's new and novel bicycle work stand in position on a bicycle taken along lines 9—9 of FIG. 8 of the drawings.

Support ears 56 and 58 have been designed to removably contact chain stays 94 and 96 at an inner underside portion of chain stays 94 and 96, respectively. By removably contacting chain stays 94 and 96 on the inner underside portion as shown in FIG. 9 of the drawings, support ears 56 and 58 provide stability to a prior art bicycle 90 when a rear wheel, not shown in FIG. 9 of the drawings for purposes of clarity, has been raised by the before described pivoting action of the bicycle work stand 20. The stability and raising of the rear wheel of a prior art bicycle 90 will be discussed more fully hereinafter.

Still referring to FIG. 9 of the drawings, there is shown notches 60 and 62 continuously formed in support plate 50 and in close proximity to support ears 56 and 58 respectively. In the Preferred Embodiment, notches 60 and 62 are generally V-shaped. Other shapes and configuration may also be used and are considered to be within the spirit and scope of the applicant's invention.

Notches 60 and 62 allow a front de-railer cable 102 and a rear de-railer cable 104, respectively, to pass through or near bicycle work stand 20 without the bicycle work stand 20 interfering with the routing of front de-railer cable 102 and rear de-railer cable 104. Additionally, notches 60 and 62 prevent bicycle work stand 20 from pinching or otherwise damaging front de-railer cable 102 and rear de-railer cable 104.

Since there are a wide variety of designs and shapes of prior art bicycles, the routing of front de-railer cable 102 and rear de-railer cable 104 may vary. Front de-railer cable 102 and rear de-rafter cable 104 may not actually pass through notches 60 and 62, respectively. However, even if the design of a prior art bicycle is such that front de-railer cable 102 does not actually pass through notch 60 and rear de-railer cable 104 does not actually pass through notch 62, notches 60 and 62 facilitate the easy removal and installation of de-railer cables 102 and 104.

New de-railer cables 102 and 104 are generally stiff and difficult to maneuver while old de-railer cables 102 and 104 generally contain various fixed bends and angles, caused by the routing of the cables 102 and 104, that are retained by the cables 102 and 104. Thus, in the case where new cables 102 and 104 are being installed on a bicycle, applicant's new and novel bicycle work stand 20 facilitates installation by allowing the cables 102 and 104 to be easily and readily passed through notches 60 and 62, respectively, and properly routed along the bicycle. Similarly, in the case where old cables are being removed, adjusted or re-routed, applicant's new and novel bicycle work stand 20 facilitates removal of cables 102 and 104 by allowing the various fixed bends and angles retained by the old cables 102 and 104 to be easily and readily passed through notches 60 and 62 respectively. Thus, repairs and adjustments to or installation or removal of cables 102 and 104 can be effected without having to realign the bicycle in the new and novel bicycle work stand 20.

Figure 10:
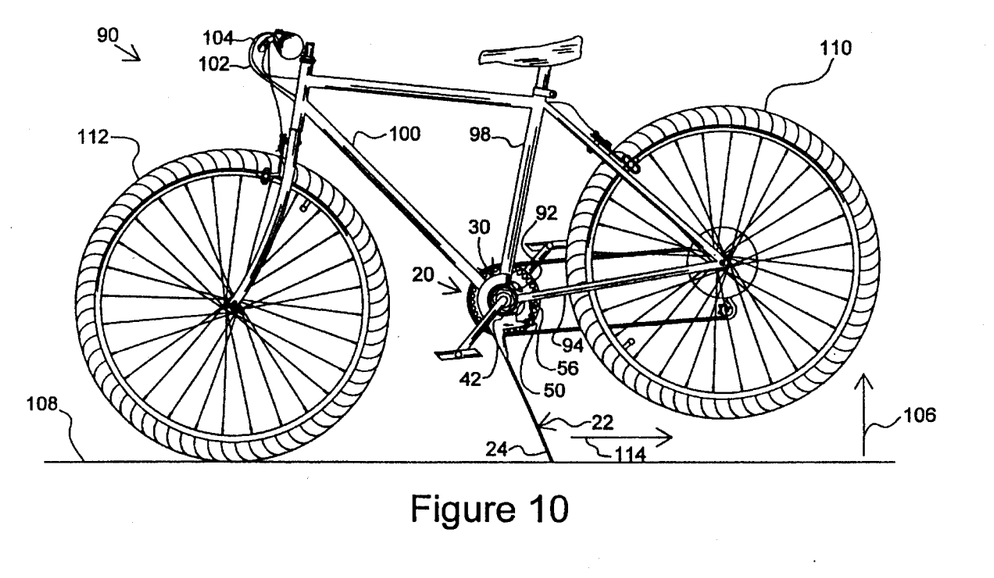
FIG. 10 is a side elevational view showing applicant's new and novel bicycle work stand in position on a prior art bicycle.

Referring now to FIG. 10 of the drawings there is shown and will be described in detail applicant's new and novel bicycle work stand 20 as utilized on a prior art bicycle, shown generally by the numeral 90. FIG. 10 is a side elevational view showing applicant's new and novel bicycle work stand 20 in position on a prior art bicycle 90.

Once applicant's new and novel bicycle work stand 20 has been positioned on the appropriate portion of a prior art bicycle 90 and the spaced apart legs 24 and 26 have been positioned on a flat surface 108 such as the ground, work bench or similar flat surface, the angular offset of spaced apart hooking means 30 and 32 front base member 22, as previously described, and the pivoting action around cradle areas 42 and 44 and thus around bottom bracket 92 as previously described, causes an uplifting effect of support ears 56 and 58 on chain stays 94 and 96, also previously described, thereby effectively raising rear wheel 110 off the flat surface 108 in the direction of the arrow 106. Spaced apart leg 26, spaced apart hooking means 32, cradle area 44, support ear 58 and chain stay 96 are not visible in FIG. 10 of the drawings but are clearly shown in FIG. 7 of the drawings.

Still referring to FIG. 10 of the drawings, the spaced apart legs 24 and 26 of base member 22 in conjunction with front wheel 112 provide a stable and balanced three point footprint, two of the three points being the spaced apart legs 24 and 26 of base member 22 and the third point being the front wheel 112 of the bicycle 90 which remains on the ground or flat surface 108 once the rear wheel 110 has been elevated. Even if front wheel 112 is moved or turned, a portion of front wheel 112 remains in contact with flat surface 108. The resulting three point footprint reduces the likelihood of the bicycle 90 being overturned if accidentally bumped or jarred. Second leg 26 is not visible in FIG. 10 of the drawings but is clearly shown in FIG. 7 of the drawings.

Additionally, the angular offset of the at least two spaced apart hooking means 30 and 32 in relation to base member 22 causes base member 22 to contact the ground or flat surface 108 at an oblique angle, the direction of the angle being away from the front wheel 112 as shown generally by the arrow 114, thereby providing additional stability and balance to the bicycle work stand 20 when positioned on a bicycle 90. Also, because support ears 56 and 58 removably contact chain stays 94 and 96 on an inner portion of chain stays 94 and 96, support ears 56 and 58 provide additional stability by restricting lateral or side-to-side movement of the prior art bicycle 90.

Still referring to FIG. 10 of the drawings, it can be clearly seen how applicant's new and novel bicycle work stand 20 facilitates the repair and adjustment of various bicycle components. The bicycle work stand 20 is designed to provide easy access to all components of the bicycle in a non-intrusive manner and without requiring realignment of the bicycle work stand 20 in relation the prior art bicycle 90 while repairs and adjustments to the prior art bicycle 90 are being effected. By supporting a bicycle 90 from the underneath portion of bottom bracket 92, all upper components of the bicycle 90 are easily and readily accessible. By raising rear wheel 110 from flat surface 108, components of the drive system and rear braking system of a bicycle are easily and readily accessible. Additionally, raising rear wheel 110 from flat surface 108 allows rear wheel 110 to freely rotate thereby facilitating repairs and adjustments to the drive system and rear braking system of a bicycle as well as facilitating repairs and adjustments to the rear wheel 110 itself.

All cables present on the bicycle 90, such as de-railer cables, brake cables and the like, are easily and readily accessible and are not interfered with by applicant's new and novel bicycle work stand 20. Additionally, the bicycle work stand 20 facilitates the removal and installation of various cables as previously described.

Figure 11:
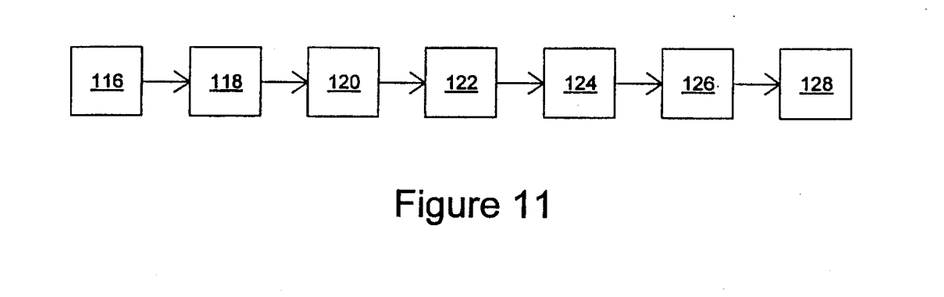
FIG. 11 is a block diagram showing applicant's new and novel method.

Referring now to FIG. 11 of the drawings there will be described in detail a new and novel method by which applicant's new and novel bicycle work stand is utilized. FIG. 11 is a block diagram showing the applicant's new and novel method.

The first step in the method, shown generally by the numeral 116, is to provide at least one bicycle work stand having a base member, at least two spaced apart hooking means and a support plate, the base member also having spaced apart legs, the at least two spaced apart hooking means also having a cradle area and the support plate also having support ears and notches in close proximity to the support ears, and also providing at least one prior art bicycle having a seat tube, a rear portion, a rear wheel, a bottom bracket and chain stays. In the second step, shown generally by the numeral 118, the bottom bracket of the bicycle is removably engaged by the at least two spaced apart hooking means of the bicycle work stand. In the third step, shown generally by the numeral 120, the seat tube is lifted upward thereby temporarily elevating the rear portion and thus the rear wheel of the bicycle. In the fourth step, shown generally by the numeral 122, the bicycle work stand is rotated into a position where the cradle area of the at least two spaced apart hooking means removably contacts an underside portion of the bottom bracket of the bicycle and the support ears removably contact the chain stays of the bicycle on an inner underside portion of the chain stays. In the fifth step, shown generally by the numeral 124, the seat tube and thus the rear portion of the bicycle is lowered until the spaced apart legs of the base member of the bicycle work stand firmly and obliquely contact the flat surface such as the ground, work bench or similar flat surface. In the sixth step, shown generally by the numeral 126, repairs and adjustments are made to the bicycle. And finally, in the last step, shown generally by the numeral 128, the bicycle work stand is removed from the bicycle by reversing steps 118 through 124.

From the above it can be seen that the applicant's new and novel bicycle work stand and method of use accomplishes all of the objects and advantages presented herein before. Nevertheless it is within the spirit and scope of the invention that changes in the applicant's basic bicycle work stand and method may be made and the Preferred Embodiment and the modifications shown and described herein have only been given by way of illustration.

Having described my invention, I claim:

1. A bicycle work stand for supporting a bicycle in a proper position on a flat surface to effect repairs and adjustments to the bicycle, the bicycle being of the type having a bottom bracket, cables, a finished surface and chain stays, the chain stays further having an inner underside portion, the bicycle work stand providing stable, balanced support of the bicycle on the flat surface, comprising:

a. base member having an end portion, a side, an opposite side, and spaced apart legs;

b. at least two spaced apart hooking means having an upper portion, a lower portion and an inner surface, the inner surface of an at least two spaced apart hooking means being fixedly attached to the side of the base member at the end portion of the base member and the inner surface of another at least two spaced apart hooking means being fixedly attached to the opposite side of the base member at the end portion of the base member;

c. a cradle area, the cradle area being continuously formed in the upper portion of each of the at least two spaced apart hooking means, wherein the cradle area removably engages the bottom bracket of the bicycle;

d. extension arms, the extension arms being continuously formed on the lower portion of the at least two spaced apart hooking means, the extension arms having an end;

e. a support plate having a side, an upper portion and a lower portion, the lower portion further having an attaching tab and a laterally opposed attaching tab, wherein the attaching tab and the laterally opposed attaching tab are continuously formed on the lower portion of the support plate, the side of the support plate being fixedly attached to the extension arms wherein the attaching tab is fixedly attached to an end of one of the extension arms and the laterally opposed attaching tab is fixedly attached to an end of another of the extension arms;

f. support ears, the support ears being continuously formed in the upper portion of the support plate wherein the support ears are designed to contact the inner underside portion of the bicycle chain stays causing the spaced apart legs to obliquely contact the flat surface;

g. notches, the notches being continuously formed in the upper portion of the support plate and in close proximity to the support ears wherein the notches prevent damage to the bicycle cable and wherein the notches further facilitate the repair and adjustment of the bicycle cables; and h. non-abrasive material wherein the non-abrasive material covers the cradle area of the at least two spaced apart hooking means and the support ears, the non-abrasive material preventing damage to the finished surface of the bicycle.

2. The bicycle work stand as defined in claim 1 wherein the at least two spaced apart hooking means have an outer edge, the at least two spaced apart hooking means being fixedly attached to the end portion of the base member where the outer edge is angularly offset from the side and opposite side of the base member.

3. The bicycle work stand as defined in claim 1 wherein the support member is fixedly attached to extension arms, the upper portion of the support member aligning with the upper portion of the at least two spaced apart hooking means and the lower portion of the support member aligning with the lower portion of the at least two spaced apart hooking means.

4. The bicycle work stand as defined in claim 1 wherein the cradle area is designed with a pre-determined shape, the pre-determined shape being designed to removably engage the bottom bracket of the bicycle.

5. The bicycle work stand as defined in claim 4 wherein the cradle area is formed in a semi-circular configuration.

6. The bicycle work stand as defined in claim 1 wherein the non-abrasive material is pre-molded removable sections of rubber, soft plastic, vinyl or similar non-abrasive material, the pre-molded removable sections being designed to conform to the shape of the cradle area of the at least two spaced apart hooking means and to the shape of the support ears.

7. The bicycle work stand as defined in claim 1 wherein the non-abrasive material is rubber, soft plastic, vinyl or similar non-abrasive material, the non-abrasive material being applied by dipping, brushing or spraying.

8. The bicycle work stand as defined in claim 1 further comprising a method wherein the bicycle work stand is used to removably engage the bottom bracket and to removably contact the chain stays of the bicycle thereby supporting the bicycle in a proper position on a flat surface to effect repairs and adjustments to the bicycle.

9. A bicycle work stand for supporting a bicycle in a proper position on a flat surface to effect repairs and adjustments to the bicycle, the bicycle being of the type having a bottom bracket, cables, a finished surface and chain stays, the chain stays further having an inner underside portion, the bicycle work stand providing stable, balanced support of the bicycle on the flat surface, comprising:

a. support plate having a side, an upper portion and a lower portion, the lower portion further having an attaching tab and a laterally opposed attaching tab, wherein the attaching tab and the laterally opposed tab are continuously formed on the lower portion of the support plate;

b. support ears, the support ears being continuously formed in the upper portion of the support plate wherein the support ears are designed to contact the inner underside portion of the bicycle chain stays;

c. notches, the notches being continuously formed in the upper portion of the support plate and in close proximity to the support ears wherein the notches prevent damage to the bicycle cable and wherein the notches further facilitate the repair and adjustment of the bicycle cables;

d. at least two spaced apart hooking means, the at least two spaced apart hooking means having an upper portion, a lower portion, an inner surface and extension arms, the extension arms being continuously formed on the lower portion of the at least two spaced apart hooking means, the extension arms having an end, an end of one of the extension arms being fixedly attached to the side of the support plate such that the end of one of the extension arms is positioned on the attaching tab, and an end of another of the extension arms being fixedly attached to the side of the support plate such that the end of another of the extension arms is positioned on the laterally opposed attaching tab;

e. a cradle area, the cradle area being continuously formed in the upper portion of the at least two spaced apart hooking means wherein the cradle area removably engages the bottom bracket of the bicycle;

f. a base member, the base member having an end portion, a side, an opposite side and spaced apart legs wherein the side is fixedly attached to the inner surface of an at least two spaced apart hooking means, the inner surface of an at least two spaced apart hooking means being positioned along the end portion of the base member, and further where the opposite side is fixedly attached to the inner surface of another at least two spaced apart hooking means, the inner surface of another at least two spaced apart hooking means being positioned along the end portion of the base member, the spaced apart legs obliquely contacting the flat surface when the cradle area removably engages the bottom bracket of the bicycle; and g. non-abrasive material wherein the non-abrasive material covers the cradel area of the at least two spaced apart hooking means and the support ears, the non-abrasive material preventing damage to the finished surface of the bicycle.

10. The bicycle work stand as defined in claim 9 wherein the at least two spaced apart hooking means have an outer edge, the at least two spaced apart hooking means being fixedly attached to the end portion of the base member where the outer edge is angularly offset from the side and opposite side of the base member.

11. The bicycle work stand as defined in claim 9 wherein the support member is fixedly attached to extension arms, the upper portion of the support member aligning with the upper portion of the at least two spaced apart hooking means and the lower portion of the support member aligning with the lower portion of the at least two spaced apart hooking means.

12. The bicycle work stand as defined in claim 9 wherein the cradle area is designed with a pre-determined shape, the pre-determined shape being designed to removably engage the bottom bracket of the bicycle.

13. The bicycle work stand as defined in claim 12 wherein the cradle area is formed in a semi-circular configuration.

14. The bicycle work stand as defined in claim 9 wherein the non-abrasive material is pre-molded removable sections of rubber, soft plastic, vinyl or similar non-abrasive material, the pre-molded removable sections being designed to conform to the shape of the cradle area of the at least two spaced apart hooking means and to the shape of the support ears.

15. The bicycle work stand as defined in claim 9 wherein the non-abrasive material is rubber, soft plastic, vinyl or similar non-abrasive material, the non-abrasive material being applied by dipping, brushing or spraying.

16. The bicycle work stand as defined in claim 9 further comprising a method wherein the bicycle work stand is used to removably engage the bottom bracket and to removably contact the chain stays of the bicycle thereby supporting the bicycle in a proper position on a flat surface to effect repairs and adjustments to the bicycle.

17. A method of using a bicycle work stand, the bicycle work stand providing stable, balanced support for positioning a bicycle on a flat surface to effect repairs and adjustments to the bicycle, comprising the steps:

a. providing at least one bicycle work stand having a base member, at least two spaced apart hooking means and a support plate, the base member also having spaced apart legs, the at least two spaced apart hooking means also having a cradle area and the support plate also having support ears and notches in close proximity to the support ears, and also providing at least one prior art bicycle having a seat tube, a rear portion, a rear wheel, a bottom bracket and chain stays;

b. removably engaging the bottom bracket of the bicycle with the at least two spaced apart hooking means of the bicycle work stand;

c. lifting the seat tube upward thereby temporarily elevating the rear portion and thus the rear wheel of the bicycle;

d. rotating the bicycle work stand into a position on the bottom bracket of the bicycle where the cradle area of the at least two spaced apart hooking means removably contacts an underneath portion of the bottom bracket and the support ears removably contact the chain stays of the bicycle on an inner underside portion of the chain stays;

e. lowering the seat tube and thus the rear portion of the bicycle until the spaced apart legs of the base member of the work stand firmly and obliquely contact the flat surface;

f. making repairs and adjustments to the now properly positioned bicycle; and g. removing the bicycle work stand from the bicycle by reversing steps b through e.

* * * * *